(12) United States Patent
Gaenzle et al.

(10) Patent No.: US 12,176,830 B2
(45) Date of Patent: Dec. 24, 2024

(54) METHOD FOR OPERATING A DRIVE TRAIN, AND VEHICLE DRIVE TRAIN WITH ELECTROMOTIVE DRIVE

(71) Applicant: Robert Bosch GmbH, Stuttgart (DE)

(72) Inventors: David Gaenzle, Leinfelden-Echterdingen (DE); Jochen Fassnacht, Calw (DE); Maximilian Manderla, Oberursel (DE)

(73) Assignee: Robert Bosch GmbH, Stuttgart (DE)

( * ) Notice: Subject to any disclaimer, the term of this patent is extended or adjusted under 35 U.S.C. 154(b) by 180 days.

(21) Appl. No.: 17/928,232

(22) PCT Filed: May 4, 2021

(86) PCT No.: PCT/EP2021/061683
§ 371 (c)(1),
(2) Date: Nov. 28, 2022

(87) PCT Pub. No.: WO2021/239406
PCT Pub. Date: Dec. 2, 2021

(65) Prior Publication Data
US 2023/0223879 A1 Jul. 13, 2023

(30) Foreign Application Priority Data
May 28, 2020 (DE) ..................... 10 2020 206 669.8

(51) Int. Cl.
*H02P 21/00* (2016.01)
*H02P 21/05* (2006.01)

(52) U.S. Cl.
CPC .................................... *H02P 21/05* (2013.01)

(58) Field of Classification Search
CPC ............. H02P 21/05; H02P 6/10; H02P 9/105
See application file for complete search history.

(56) References Cited

FOREIGN PATENT DOCUMENTS

| DE | 102015119167 A1 | 5/2016 | |
|----|-----------------|--------|---|
| DE | 102015207632 A1 | 10/2016 | |
| DE | 102016211394 A1 | 12/2017 | |
| DE | 102021213252 A1 * | 5/2023 | ......... F16H 57/0006 |
| EP | 2007005 A2 | 12/2008 | |

OTHER PUBLICATIONS

Translation of International Search Report for Application No. PCT/EP2021/061683 dated Aug. 3, 2021 (2 pages).

* cited by examiner

*Primary Examiner* — Karen Masih
(74) *Attorney, Agent, or Firm* — Michael Best & Friedrich LLP

(57) ABSTRACT

The invention relates to a vehicle drive train and to a method for operating a drive train with an electromotive drive (4), wherein a rotational speed and a drive torque of the drive (4), which are convertible via a toothed transmission stage (12) for an output (19), and the drive (4) is controlled by means of a control signal (40), wherein the control signal (40) has superimposed thereon a periodic torque change signal (5), which is in phase with a tooth stiffness change of the toothed transmission stage (12), wherein a signal strength of the torque change signal (5) is lower with decreasing tooth stiffness than with increasing tooth stiffness.

12 Claims, 3 Drawing Sheets

METHOD FOR OPERATING A DRIVE TRAIN, AND VEHICLE DRIVE TRAIN WITH ELECTROMOTIVE DRIVE

BACKGROUND OF THE INVENTION

The invention relates to a method for operating a drive train. Furthermore, the invention relates to a vehicle drive train having an electromotive drive.

In electric vehicle drive trains, in comparison with vehicles having an internal combustion engine, the internal combustion engine is no longer an issue as a noise source and is replaced by the significantly quieter electric motor. As such, noises then appear disruptive which did not appear so in the internal combustion engine drive train, since the internal combustion engine or its auxiliary units drowned them out. This is particularly true at low driving speeds of the vehicle, since at high speeds the tire rolling noises and wind noises dominate and cover any additional noises.

DE 10 2015 207 632 A1 relates to an apparatus for reducing gear noise of a drive gear which is in engagement with an output gear, wherein forces from the gear wheels can be conducted into a housing via a support, wherein the apparatus has a sensor device, a control device, and an actuator, and wherein a dynamic vibration signal can be detected by means of the sensor device and the vibration signal can be relayed to the control device, wherein, by means of the control device, a vibration reduction signal can be generated which can be relayed to the actuator, wherein the actuator is arranged on or in the support in such a way that forces can be transmitted from the gear wheels via the actuator into the housing, wherein a relative displacement and/or a force application of a component supported by the support can be actively implemented by means of the actuator. The apparatus is also configured for use of the actuator as a sensor device.

SUMMARY OF THE INVENTION

It is an object of the invention to provide a method and a device which make it possible to operate a drive train which is operated, in particular exclusively, by an electric motor.

According to the invention, a method for operating a drive train with an electromotive drive provides that

- a rotational speed and a drive torque of the drive can be converted via a toothed transmission stage for an output, and
- the drive is controlled using a control signal.

A periodic torque change signal is superimposed onto the control signal, which periodic torque change signal alternately reduces and amplifies the drive torque and is in phase with a tooth stiffness change of the toothed transmission stage, wherein a signal strength of the torque change signal is lower with decreasing tooth stiffness than with increasing tooth stiffness.

An advantage of the method is that no, or nearly no, disruptive noise is produced due to the variable tooth stiffness when two gear wheels mesh in rotation. Such a noise would be tonal and would increase with increasing torque, which is transmitted via the transmission stage. The tooth stiffness specifically changes periodically with each individual pair of teeth in engagement at any moment. The frequency of this change is thus, in simple spur gear stages, the rotational speed of the gear wheels multiplied by its number of teeth.

An advantage of the invention is that it does not result in additional costs or additional weight, and can be implemented purely by means of a software expansion. The software can also be implemented very late in the development process, or even subsequently, for example as a software update for vehicles in the field. The computation resource intensity in the control device is low for this purpose. Only the rotor position and the position of the gear wheels, which is defined by the construction, and an estimated value of the torque are necessary as signals for this purpose. The torque of the electric machine can be estimated by the field-oriented control, and the rotor position is also measured or estimated for this purpose. In principle, no additional sensors are therefore necessary.

The method according to the invention can also be used in other drive trains with electric machines having a transmission, but no internal combustion engine. Such a drive train can be, for example, a drive train in the field of industrial engineering or also in the field of white goods. White goods include, inter alia, refrigerators, freezers, etc., the refrigerant compressor of which is driven by an electric motor. White goods are, however, also washing machines and dishwashing machines, the pump or drum of which is driven by an electric motor. In addition, the drive train according to the invention can also be used in power tools having a transmission. Such power tools having gear wheels include in particular drilling machines. However, for example, electrical saws and grinding machines can also have such drive trains with a transmission in each case.

According to one refinement, it is provided that the control signal is a torque control signal of a torque control, or an output voltage signal of a torque control. Such control signals are advantageous in typical electromotive drives.

According to one refinement, it is provided that the output voltage signal or the torque control signal of the torque control is associated with a field-oriented torque control or current control. The precision of the rotational speed and positioning of the electromotive drive is improved by means of a field-oriented torque control or current control using a frequency converter for the electromotive drive.

According to one refinement, it is provided that the periodic torque change signal is superimposed onto the control signal as a function of a torque setpoint value or a rotor position of the drive. This dependence on the torque is particularly advantageous since the influence of the tooth stiffness change changes together with the transmitted torque of the transmission. In this respect, the amplitude of the torque change signal can be adjusted according to the optionally changing torque.

According to one refinement, it is provided that the periodic torque change signal has a sinusoidal shape. A sinusoidal signal can be controlled particularly easily.

According to one refinement, it is provided that the periodic torque change signal has a rectangular shape. Such a rectangular shape can be easily represented in a digital manner.

In order to achieve improved noise reduction, it can be provided that the periodic torque change signal reproduces the tooth stiffness and is stored in a table or is described by a mathematical function.

It can also be provided for improved noise reduction that a mean value of the periodic torque change signal is equal to zero.

For particularly good functioning of a field-oriented torque control over the entire rotational speed range, it can be provided that, in order to control the drive train, an effect of noise damping on the real route can be masked out for a field-oriented torque control of the drive via a suitable route model and a subtraction of its output signal from the measurement signal of the real route.

According to the invention, a vehicle drive train having an electromotive drive comprises:
- a drive, the drive torque and rotational speed of which are variable,
- a toothed transmission stage which can be coupled to the drive to convert the rotational speed and the drive torque,
- a control device for controlling the drive using a control signal.

In this case, it is provided that a periodic torque change signal can be superimposed onto the control signal by means of the control device, which periodic torque change signal alternately reduces and amplifies the drive torque and is in phase with a tooth stiffness change of the toothed transmission stage, and that a signal strength of the torque change signal is lower with decreasing tooth stiffness than with increasing tooth stiffness.

In order to further reduce disruptive noises, various further design measures can be implemented. For example, the overlap of the teeth of the gear wheels can be increased. In addition, the transmission housing can be reinforced. The additional costs associated with a housing reinforcement can be reduced by the embodiment according to the invention.

The invention makes it possible to provide a drive train which is smooth in spite of a straight toothing, and thus to save the additional costs for a helical toothing. However, a helical toothing can also be used in a drive train according to the invention. Compared to a straight toothing, a helical toothing achieves better running smoothness and lower noise production, since each tooth pair runs in and out of the engagement with a continuous transition. The torque is thus transmitted more uniformly than in the case of a straight toothing.

Both the method and the device can find application in a vehicle drive train that is operated exclusively by an electric motor. This means that the transmission stage cannot be coupled to an internal combustion engine.

BRIEF DESCRIPTION OF THE DRAWINGS

Possible embodiments of the invention will be explained below with reference to the accompanying drawings.

In the drawings.

DETAILED DESCRIPTION

Figure 1:
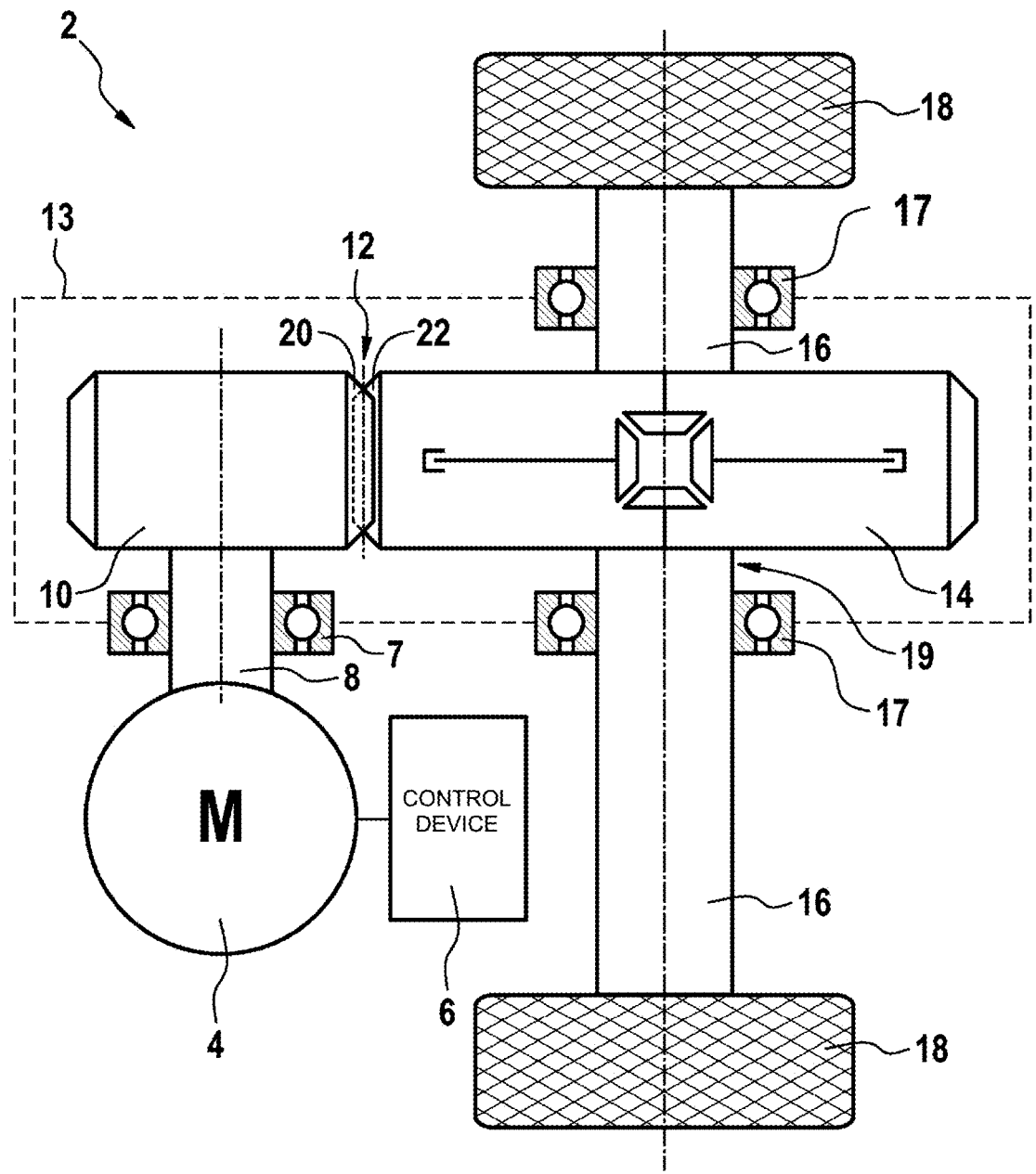
FIG. 1 shows a vehicle drive train having a drive and an associated control device with noise damping.

FIG. 1 schematically shows a vehicle drive train 2 of an electric motor vehicle. The electric motor vehicle has no internal combustion engine drive, and accordingly only has an electromotive drive 4. The drive 4 is designed in particular as a converter-controlled synchronous motor. Depending on the motor vehicle type, the electromotive drive 4 can alternatively also be designed as a DC motor or as a converter-controlled asynchronous motor. A further alternative for the drive 4 is a switched reluctance motor, which is also referred to as SRM for short. Furthermore, a transverse flux motor can be used as the drive 4.

The drive torque and the rotational speed of the drive 4 are variable by means of a control device 6, which is provided to control the drive 4 in this respect.

An output shaft 8 of the drive 4 which is rotatably mounted by means of a rolling bearing 7 is connected to a first gear wheel 10 of a toothed transmission stage 12 which is arranged within a transmission housing 13. The first gear wheel 10 meshes with a second gear wheel 14 of the transmission stage 12. The second gear wheel 14 is coupled via a differential gear to two drive shafts 16 which are mounted in rolling bearings 17 and are connected to vehicle wheels 18 for conjoint rotation.

The first gear wheel 10 is smaller in diameter than the second gear wheel 14, and thus forms a pinion. A rotational speed and a drive torque of the drive 4 are converted via the toothed transmission stage 12 for an output 19 which comprises the drive shafts 16. The rotational speed of the drive 4 is reduced to a lower transmission output speed by means of the transmission stage 12, and the drive torque is increased to a higher transmission output torque. As such, a drive 4 which has a relatively high maximum rotational speed but a torque which is too low can be used.

The second gear wheel 14 includes the differential gear, which distributes the transmission output torque uniformly to the two vehicle wheels 18.

Alternatively, the transmission stage 12 can also be designed as a planetary transmission and/or as a switchable transmission having a plurality of stages, in particular two stages, which have different transmission ratios. The vehicle drive train 2 can also be designed as a wheel hub motor which drives only a single vehicle wheel 18.

The gear wheels 10, 12 are straight-toothed or helical-toothed. The teeth 20, 22 of the gear wheels 10, 12 mesh with one another. The system of the two intermeshing gear wheels 10, 12 having a variable tooth stiffness represents a dual mass oscillator having a variable spring constant.

The first gear wheel 10 has a first mass inertia and the second gear wheel 12 has a second mass inertia. Consequently, the two gear wheels 10, 12 form the dual mass oscillator which oscillates with variable rotational path-dependent frequency-a tooth engagement frequency.

As a result of the variable tooth stiffness of the teeth, oscillations are excited in the meshing gear wheels 10, 12 during rotation, which oscillations are transmitted via the gear wheels 10, 12, the shafts 8, 16, and the rolling bearings 7, 17 to the transmission housing 13 and are emitted there by a vibrating surface as noise. In addition to the rotational oscillations, the gear wheels 10, 12 also oscillate translationally with the bearings 7, 17 against the transmission housing 13, as a result of which the noise is produced. In this case, the transmission housing 13 is excited to translational oscillations via the bearings 7, 17, so that sound waves in the form of pressure and density fluctuations propagate in the air. The variable tooth engagement force engages in the intersection of the two gear wheels 10, 12 and acts tangentially on the respective gear wheels 10 and 12. This force must be borne by the respective bearings 7 and 17.

The control device 6 has a control system which is based on the impression, i.e., the superposition, of a periodic additive torque oscillation via the electric drive 4 onto the tooth engagement frequency during operation of the electric motor vehicle for damping undesired noises. For this purpose, a periodic torque change signal is superimposed onto a control signal of the drive 4. The periodic torque change signal alternately reduces and increases the drive torque. In this case, the periodic torque change signal is in phase with the tooth stiffness of the transmission stage 12 connected into the force flow. The control signal can in particular be a torque control signal or an output voltage signal of a torque control. This torque control can in particular be field-oriented, i.e., a vector control. Field-oriented control ensures that the precision of the rotational speed and positioning is improved using a frequency converter provided in the control device 6.

This torque change signal ideally has no direct component, or has a direct component of zero. The torque change signal increases or reduces a transmitted total torque occurring in the drive 4 due to the torque control signal and the drive control signal. In this case, the tooth stiffness of the teeth 20, 22 that are currently in tooth engagement determines whether the total torque is increased or reduced. On average, the output torque requested by the driver, which is set by the torque control operating in parallel, is therefore not changed. The periodic torque change signal can reproduce the exact profile of the torque fluctuation, or can be approximated by a sinusoidal signal of the same phase and frequency, for example.

Since the influence of the tooth stiffness change changes with a transmission output torque requested by the driver, the amplitude, i.e., a signal strength, of the torque control signal must be adjusted in accordance with the requested transmission output torque.

The control by means of the control device 6 is explained in more detail below using control variables.

By adding a periodic stationary torque setpoint signal or voltage setpoint signal to an output signal of the, for example, field-oriented torque controller or current controller, a transmission noise is damped with the tooth engagement frequency. The change in stiffness over the rotational path acts as an oscillation excitation for the dual mass oscillator at a constant torque. That is to say, the teeth which are in each case in engagement with one another are excited to oscillations with respect to each other. This excitation counteracts the modulation of the torque of the drive 4. To this end, a signal strength of the drive control signal is slightly reduced when the tooth stiffness decreases. In contrast, a signal strength of the drive control signal is slightly increased when the tooth stiffness increases.

Figure 2:
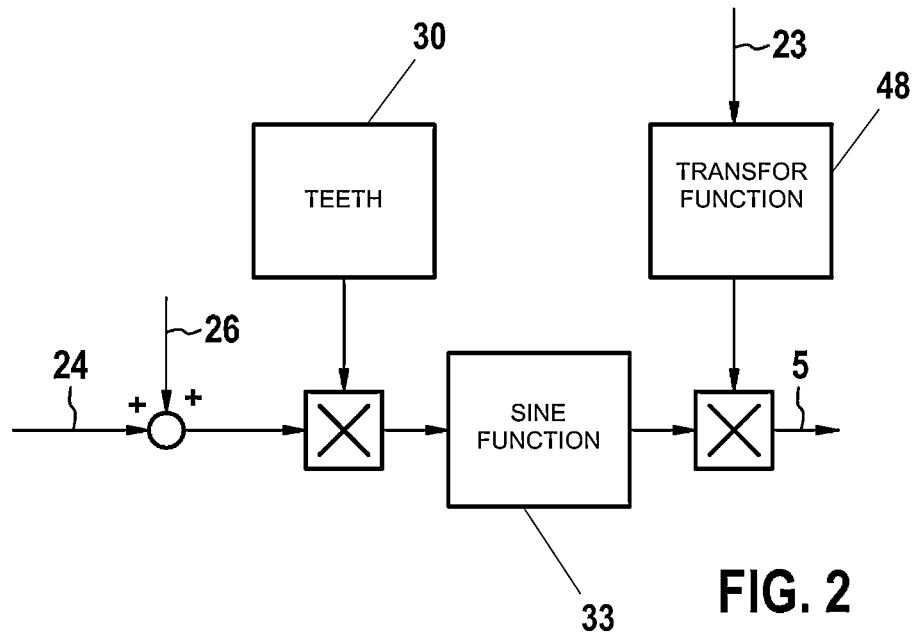
FIG. 2 shows, with a block diagram, the integration of noise damping into the vehicle drive train according to FIG. 1, wherein a stationary torque change signal is reproduced.

FIG. 2 shows, with a block diagram, a first embodiment of the method. The torque change signal 5 is reproduced in a stationary manner. No control variable is fed back; as such, there is open-loop control in the example. The input variables are the torque 23 and the rotor position 24 of the drive. An offset position 26 is added to this rotor position 24. The number of teeth 30 of the gear wheels in an input of the open-loop control. The torque 23 as input variable can be represented in the model via a transfer function 32 of the rotational amplitude. The main parameter of the stationary torque change signal is a sine function 33. The output variable is the torque change signal 5 for damping the oscillations.

Figure 3:
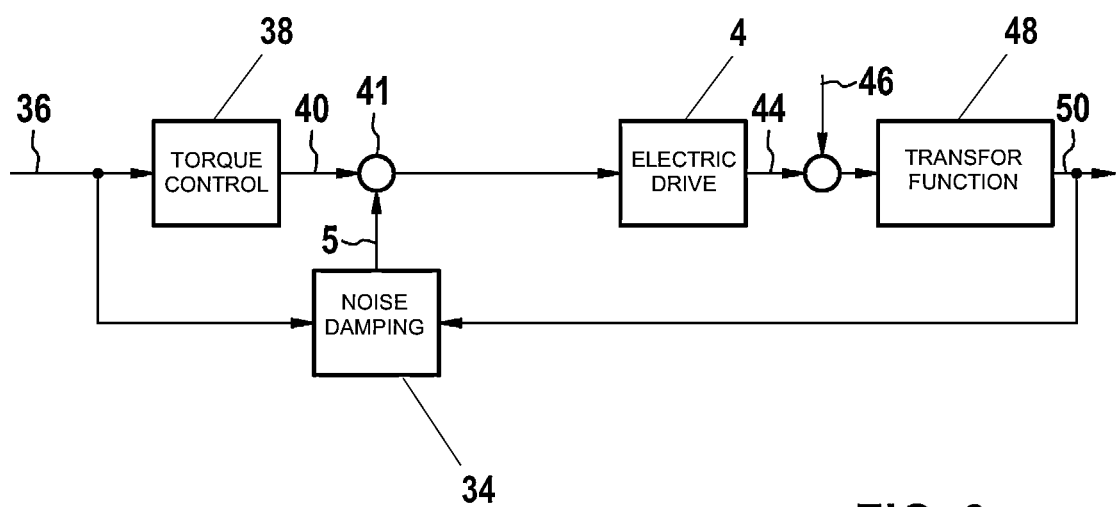
FIG. 3 shows, with a block diagram, a further embodiment in which the integration of noise damping takes place as a superposition onto the stator voltage setpoint value for an inverter of the drive.

FIG. 3 shows, with a second embodiment, the integration of the noise damping 34 as an addition to the stator voltage setpoint value 40 for a control device of the drive 4 designed as an inverter. In this case, instead of the sine function, a two-dimensional table is used which outputs the appropriate torque setpoint value 36 of the drive via the rotor position and the torque. Different periodic signals can be contemplated for this purpose. Preferably, either a rectangular function or a sinusoidal function stored in a tabular form is used. Sinusoidal and rectangular functions are easy to implement. Alternatively, however, the tooth stiffness can also be reproduced as precisely as possible and stored in the table. Alternatively, the tooth stiffness can be approximated using a function. Accordingly, possible integrations of the noise damping 34 in an existing field-oriented torque control 38 or current control are shown in FIG. 3.

In the field-oriented torque control 38, the torque setpoint value 36 is used as the input variable. As the output variable, the stator voltage setpoint value 40 is output by the field-oriented torque control 38, which value in this respect constitutes the control signal of the drive 4. This stator voltage setpoint value 40 is added together with a torque change signal 5, which is the output value of the noise damping 34, at a summation node point 41. The result of this summation is relayed as an input value to the electric drive 4, and can be described for modeling by means of a transfer function. The electric drive 4 has a drive torque 44. The engagement of the teeth acts as an interference variable 46 on this drive torque 44. The frequency of the oscillation excitation of the intermeshing gear wheels of the transmission stage can be described in the model by a transfer function 48. The output variable of the transfer function 48 is the output signal of the mechanical system, which can in particular be the speed 50 of the electric vehicle or the surface speed of the transmission stage. This output signal of the mechanical system is also an input variable of the noise damping 34.

Figure 4:
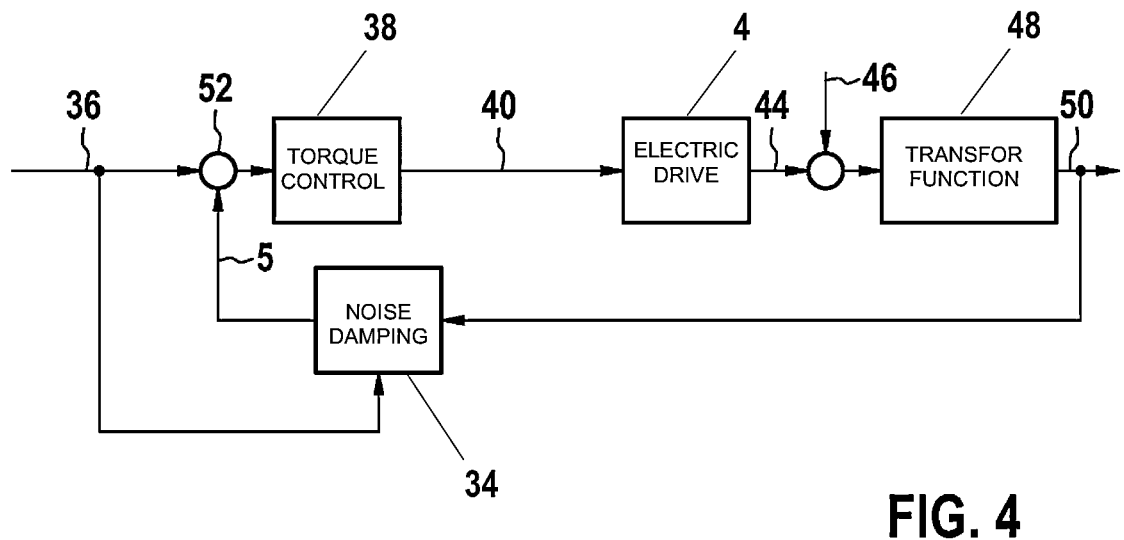
FIG. 4 shows, with a block diagram, a further embodiment in which the integration of noise damping takes place as a superposition of a periodic torque change signal onto the torque setpoint value.

FIG. 4 shows a third embodiment which represents a further refinement with respect to the second embodiment. The noise damping 34 is integrated into the control device by adding a periodic torque change signal 5 to the torque setpoint value 36. The rotor position and the setpoint value of the torque are used as input values. In contrast to the second exemplary embodiment according to FIG. 3, the torque change signal 5 output by the noise damping 34 is conveyed, together with the torque setpoint value 36, to a summation node 52, the output value of which forms the input value of the field-oriented torque control 38. This prevents the field-oriented torque control 38 from removing the signal of the noise damping 34, since this oscillation of the rotational speed or of the torque constitutes interference for the field-oriented torque control 38. If the effect of the noise damping 34 on the rotational speed signal is reproduced with a model and is subtracted from the measured value for the field-oriented torque control 38, the field-oriented torque control 38 is not able to see and remove the noise damping 34 as an interference variable. This removal takes place particularly at low rotational speeds, since in such cases the dynamics of the field-oriented torque control 38 are sufficient for removal. Further, in contrast to the second exemplary embodiment, no summation node is provided between the field-oriented torque control 38 and the drive 4.

Figure 5:
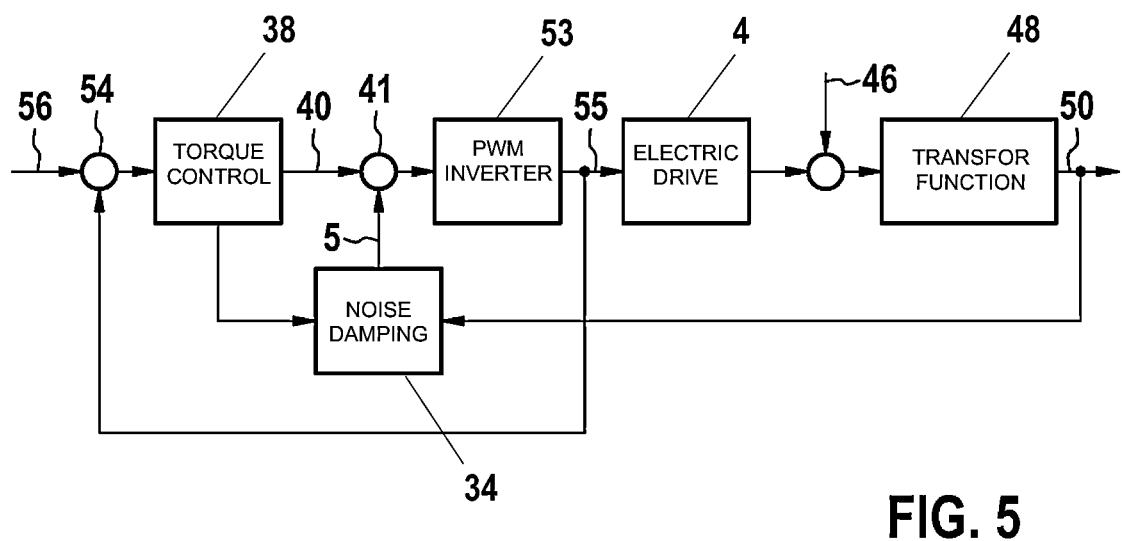
FIG. 5 shows, with a block diagram, a further embodiment in which the integration of noise damping takes place as a superposition onto the voltage setpoint value for a pulse width modulated inverter of the drive.

FIG. 5 shows a fourth embodiment which likewise represents a further refinement with respect to the second embodiment. The noise damping 34 is integrated into the control device of the drive 4.

The noise damping 34 superimposes the torque change signal 5 onto the stator voltage setpoint value 40 for a pulse width modulated inverter 53. The rotor position and torque value of the field-oriented torque control 38 are again used as input variables.

In contrast to the second and the third embodiment, an output signal of the field-oriented torque control 38 is relayed directly to the noise damping 34. In addition, in contrast to the second embodiment, the voltage 55 applied to the drive 4 is tapped and returned to a further summation node 54 at which this voltage 55 is summed with the electrical current setpoint value 56 of the drive 4, wherein the result of this summation is relayed as an input value to the field-oriented torque control 38. The pulse width modulated inverter 53 receives a sum of the stator voltage setpoint value 40 and the torque change signal 5 of the noise damping 34 from the summation node 41 as an input value. The pulse width modulated inverter 53 controls the drive 4.

The method for operating a vehicle drive train shown above can be designed as part of an axle system or as a software option with a pulse width modulated inverter or a control device, and in this respect constitutes a vehicle component.

The invention claimed is:

1. A method for operating a drive train having an electromotive drive (4), the method comprising:
    converting a rotational speed and a drive torque of the drive (4) via a toothed transmission stage (12) for an output (19),
    generating a control signal (40) and superimposing a periodic torque change signal (5) onto the control signal (40), which periodic torque change signal alternately reduces and amplifies the drive torque and is in phase with a tooth stiffness change of the toothed transmission stage (12), wherein a signal strength of the torque change signal (5) is lower with decreasing tooth stiffness than with increasing tooth stiffness.

2. The method according to claim 1, wherein the control signal (40) includes a torque control signal of a torque control (38) or an output voltage signal of a torque control (38).

3. The method according to claim 2, wherein the output voltage signal or the torque control signal of the torque control is associated with a field-oriented torque control (38) or current control.

4. The method according to claim 1, wherein the periodic torque change signal (5) is superimposed onto the control signal (40) as a function of a torque setpoint value (36) or a rotor position (24) of the drive (4).

5. The method according to claim 1, wherein the periodic torque change signal (5) has a sinusoidal shape.

6. The method according to claim 1, wherein the periodic torque change signal (5) has a rectangular shape.

7. The method according to claim 1, wherein the periodic torque change signal (5) reproduces the tooth stiffness and is stored in a table or is described by a mathematical function.

8. The method according to claim 1, wherein a mean value of the periodic torque change signal (5) is equal to zero.

9. A vehicle drive train having an electromotive drive, comprising:
    a drive (4) having a variable drive torque and a variable rotational speed,
    a toothed transmission stage (12) configured to be coupled to the drive (4) to convert the rotational speed and the drive torque,
    a control device (6) for controlling the drive (4) via a control signal (40),
    wherein
    the control device (6) is configured to superimpose a periodic torque change signal (5) onto the control signal (40)
    which periodic torque change signal alternately reduces and amplifies the drive torque and is in phase with a tooth stiffness change of the toothed transmission stage (12), and in-that a signal strength of the torque change signal (5) is lower with decreasing tooth stiffness than with increasing tooth stiffness.

10. The vehicle drive train according to claim 9, wherein the control signal (40) includes a torque control signal of a torque control (38) or an output voltage signal of a torque control (38).

11. The method according to claim 1, wherein, for controlling the drive train, an effect of noise damping (34) can be masked out for a field-oriented torque control (38) of the drive (4) via a model and a subtraction of its output signal from the measurement signal of the field-oriented torque control (38).

12. A method for operating a drive train having an electromotive drive (4), the method comprising:
    converting a rotational speed and a drive torque of the drive (4) via a toothed transmission stage (12) for an output (19),
    generating a control signal (40) and superimposing a periodic torque change signal (5) onto the control signal (40), which periodic torque change signal alternately reduces and amplifies the drive torque and is in phase with a tooth stiffness change of the toothed transmission stage (12), wherein a signal strength of the torque change signal (5) is lower with decreasing tooth stiffness than with increasing tooth stiffness,
    wherein the periodic torque change signal (5) reproduces the tooth stiffness and is stored in a table or is described by a mathematical function.

* * * * *